US010730777B2

(12) United States Patent
Kuzma et al.

(10) Patent No.: US 10,730,777 B2
(45) Date of Patent: Aug. 4, 2020

(54) SEWAGE SLUDGE PROCESSING WITH MULTI-STAGE THERMOPHILIC DIGESTER

(71) Applicant: Anaergia Inc., Burlington (CA)

(72) Inventors: Matthew John Kuzma, Encinitas, CA (US); Juan Carlos Josse, Aliso Viejo, CA (US)

(73) Assignee: ANAERGIA INC., Burlington (CA)

( * ) Notice: Subject to any disclaimer, the term of this patent is extended or adjusted under 35 U.S.C. 154(b) by 0 days.

(21) Appl. No.: 16/098,998

(22) PCT Filed: May 16, 2017

(86) PCT No.: PCT/CA2017/050582
§ 371 (c)(1),
(2) Date: Nov. 5, 2018

(87) PCT Pub. No.: WO2017/197507
PCT Pub. Date: Nov. 23, 2017

(65) Prior Publication Data
US 2019/0152822 A1 May 23, 2019

Related U.S. Application Data

(60) Provisional application No. 62/337,413, filed on May 17, 2016.

(51) Int. Cl.
*C02F 11/04* (2006.01)
*C02F 11/12* (2019.01)
*C02F 11/14* (2019.01)

(52) U.S. Cl.
CPC .............. *C02F 11/04* (2013.01); *C02F 11/12* (2013.01); *C02F 11/14* (2013.01);
(Continued)

(58) Field of Classification Search
CPC ...... C02F 11/04; C02F 11/12; C02F 2301/08; C02F 2301/106; C02F 11/14; C02F 2203/006
(Continued)

(56) References Cited

U.S. PATENT DOCUMENTS 5,417,861 A * 5/1995 Burnham ................ C02F 1/66
210/609
7,641,796 B2 1/2010 Stroot et al.
(Continued)

FOREIGN PATENT DOCUMENTS

CA 2517032 A1 9/2004
CA 2939565 A1 * 4/2009
(Continued)

OTHER PUBLICATIONS

International Patent Application No. PCT/CA2017/050582, International Preliminary Report on Patentability dated Nov. 29, 2018.
(Continued)

*Primary Examiner* — Fred Prince
(74) *Attorney, Agent, or Firm* — Borden Ladner Gervais LLP; Michael Damiani

(57) ABSTRACT

Sewage sludge is treated to produce Class A (generally pathogen free) biosolids. Some or all of the sewage sludge is thickened or dewatered to 10 wt % dried solids and then fed to a thermophilic anaerobic digester. The thermophilic digester has multiple stages provided by way of a tank with at least one internal wall. Effluent from the thermophilic digester is treated further in a mesophilic anaerobic digester.

11 Claims, 1 Drawing Sheet

(52) U.S. Cl.
CPC .... *C02F 2203/006* (2013.01); *C02F 2301/08* (2013.01); *C02F 2301/106* (2013.01)

(58) Field of Classification Search
USPC ............... 210/603, 609, 613, 175, 252, 259
See application file for complete search history.

(56) References Cited

U.S. PATENT DOCUMENTS

| | | | |
|---|---|---|---|
| 2003/0217968 A1* | 11/2003 | Goel | C02F 3/1221 |
| | | | 210/605 |
| 2008/0073266 A1* | 3/2008 | McWhirter | C02F 3/121 |
| | | | 210/605 |
| 2009/0107913 A1 | 4/2009 | Johnson | |
| 2013/0105390 A1 | 5/2013 | Gray et al. | |
| 2015/0210577 A1* | 7/2015 | Pardo | C02F 3/006 |
| | | | 210/603 |

FOREIGN PATENT DOCUMENTS

| | | |
|---|---|---|
| CA | 2918772 A1 | 7/2016 |
| WO | WO 2012/019310 A1 * | 2/2012 |
| WO | WO 2013/056337 A1 * | 4/2013 |
| WO | 2013155630 A1 | 10/2013 |

OTHER PUBLICATIONS

International Patent Application No. PCT/CA2017/050582, International Search Report and Written Opinion dated Aug. 21, 2017.
European Patent Application No. 17798444.0, Extended European Search Report dated Jan. 2, 2020.

* cited by examiner

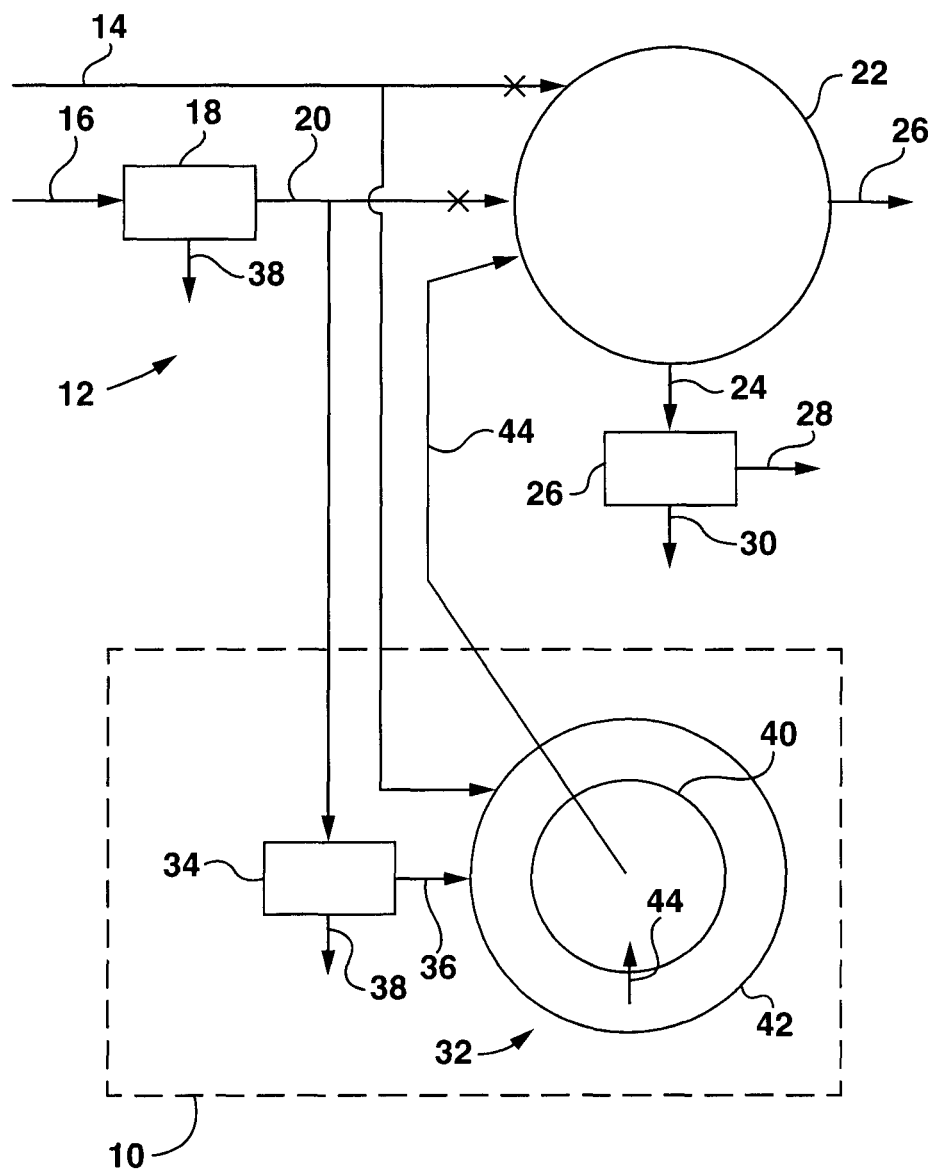

US 10,730,777 B2

SEWAGE SLUDGE PROCESSING WITH MULTI-STAGE THERMOPHILIC DIGESTER

CROSS-REFERENCE TO RELATED APPLICATIONS

This application is a National Stage Entry of International Application No. PCT/CA2017/050582, filed May 16, 2017, which claims the benefit of U.S. Application Ser. No. 62/337,413, filed May 17, 2016, which is incorporated herein by reference.

FIELD

The specification relates to treating sewage sludge optionally to produce Class A biosolids.

BACKGROUND

A typical wastewater treatment plant produces one or more sewage sludges such as primary sludge and waste activated sludge. Some or all of the sewage sludge may be thickened up to about 6 wt % dried solids. The sewage sludge can be further treated in a mesophilic anaerobic digester. The resulting digestate is a Class B biosolid with no value or limited value.

INTRODUCTION

This specification describes a sewage sludge treatment system and process. The system and process may be used to produce pasteurized, pathogen reduced, or Class A biosolids.

A system described herein has a thermophilic anaerobic digester and a thickening or dewatering device. The thickening or dewatering device is adapted to produce a sludge or cake at 10% DS or more. The thermophilic digester is connected to receive sludge or cake from the thickening or dewatering device. The thermophilic digester has a single continuous external wall and one or more internal walls configured to provide a multiple stages in series along a flow path through the thermophilic digester.

In a process described herein, sewage sludge is thickened or dewatered to 10% DS or more. The thickened sludge or cake is treated through at least two stages of thermophilic anaerobic digestion. In an example, sludge is thickened in a screw thickener and pumped to a thermophilic digester tank. The digester tank has concentric cylindrical walls forming multiple stages. The thickened sludge flows through the stages in series.

BRIEF DESCRIPTION OF THE FIGURES

FIG. 1 is a schematic process flow diagram of a sludge treatment system.

DETAILED DESCRIPTION

FIG. 1 shows a sludge treatment system 10. In this example, the sludge treatment system 10 includes the components within the dashed line box in FIG. 1. The sludge treatment system 10 has been retrofit into an existing sludge handling system 12 of a wastewater treatment plant (WWTP). Existing pipes in the WWTP were closed at the locations marked with an "X" in FIG. 1. In other examples, the sludge treatment system 10 could include one or more, optionally all, of the process units shown in FIG. 1 as part of the sludge handling system 12, any or all of which could be new construction rather than a retrofit.

In the example of FIG. 1, the WWTP (not shown) produces primary sludge (PS) 14 and waste activated sludge (WAS) 16. Primary sludge typically has a solids concentration of about 2-5% on a dried solids weight percent (DS). WAS typically has a solids concentration of about 1% DS for a WWTP with a conventional secondary separator. The WAS 16 passes through a WAS thickener 18 to produce thickened waste activated sludge (TWAS) 20 at about 4-6% DS. Liquid effluent 38 from WAS thickener 18 may be returned to the head of the WWTP.

In other examples, the sludge treatment system 10 could be coupled with a membrane bioreactor. A membrane bioreactor can produce PS and WAS as described above or, in some cases, WAS at a higher concentration, for example about 3-5%, without the use of WAS thickener 18. In other cases, a WWTP could produce one or more sludge streams each having a solids concentration between about 1 and 6% DS.

In the sludge handling system 12 before the retrofit shown in FIG. 1, primary sludge and WAS or TWAS were fed to an anaerobic digester 22. This digester 22 typically operates in the mesophilic range with a hydraulic retention time (HRT) and solids retention time (SRT) of about 10-15 days or more. The digester may have one or more tanks, in parallel or in series. The digester 22 produces digestate 24 and biogas 26. The digestate 24 may be disposed of (for example by land application) or sent to a dewatering unit 26. Dewatering unit 26 produces liquid effluent 28 and cake 30. Liquid effluent 28 may be sent back to the head of the WWTP for further treatment. Cake 30 may be landfilled or re-used, for example as a source material for composting.

In the absence of the sludge treatment system 10, the digestate 24 and cake 30 are Class B biosolids. However, adding the sludge treatment system 10 optionally allows Class A digestate 24 or cake 30 to be produced. The improvement in biosolids quality is a result of the thermophilic anaerobic digester 32. The thermophilic digester 32 may be operated at a temperature and solids retention time (SRT) sufficient to pasteurize the sludge being treated or to otherwise reduce pathogen concentrations to at or below a level specified in applicable regulations defining Class A biosolids in the USA. In other countries the process may be operated so as to meet corresponding standards defining biosolids with the lowest levels of pathogens, which may be called enhanced biosolids or by other names.

Many existing WWTPs are located within built cities and there is very little space available for additional treatment units. Thermophilic digesters also require heating, which can add to the energy consumption of a WWTP if sufficient sources of waste heat are not available. The sludge treatment system 10 aims to provide a compact and energy efficient way to provide thermophilic digestion in a sludge handling system.

The sludge treatment system 10 has a secondary thickener 34 and a thermophilic digester 32. In the example shown, secondary thickener 34 receives TWAS 20. Alternatively, one or more secondary thickeners 34 could receive one or more of WAS 16, TWAS 20, PS 14 and pre-thickened PS 14, fed separately or as a mixture. However, waste activated sludge is easier to thicken than primary sludge. Accordingly, the flow rate averaged solids concentration of influents to the thermophilic digester 32 can be increased to at least 7% DS, for example, more efficiently by thickening only the waste activated sludge.

The secondary thickener 34 optionally produces thickened sludge 36 at 10% DS or more, for example about 12-16% DS. At this solids content, thickened sludge 34 is near the solids concentration limit for pumping but can still be pumped into thermophilic digester 32. Liquid effluent 38 from secondary thickener 34 can be returned to the head of the wastewater treatment plant for further treatment.

Optionally, a dewatering unit may be used in place of secondary thickener 34. A dewatering unit will produce a cake that may be conveyed to thermophilic digester 32 by conventional solids handling equipment. Alternatively, cake from a dewatering unit can be blended with sludge at a lower solids concentration to produce a pumpable mixture. For example, waste activated sludge cake at 20% DS or more may be blended with un-thickened PS 14 to produce a mixture that is pumped to thermophilic digester 32. This option can be useful in particular if a WWTP already has available sludge dewatering equipment. Polymers or other coagulants or flocculants may be added to the sludge to aid in thickening or dewatering.

In the example shown in FIG. 1, the secondary thickener 34 is a screw thickener. A suitable thickener is shown in International Publication Number WO 2013/155630 A1, Sludge Screw Thickener with Screen Rotation During Cleaning, by Anaergia Inc. This publication is incorporated by reference.

Thickening one or more influent streams to the thermophilic digester 32 decreases the amount of water that needs to be heated in order to maintain an effective temperature in the thermophilic digester 32. Thickening also leads to higher solids content in the thermophilic digester 32. This increases heat production per unit volume of digestate by bacteria in the thermophilic digester 32 and reduces the reactor volume required for a given solids throughput. Reducing reactor volume typically reduces reactor surface area and therefore reduces heat loss through the outside surfaces of the reactor.

Thermophilic digester 32 further reduces reactor surface area by providing multiple stages with at least one shared wall. Multiple stages are beneficial since they inhibit short-circuiting in mixed tanks and so provide a more uniform retention time. Enclosing multiple stages within a single continuous exterior wall reduces the surface area for heat loss relative to having a separate tank for each stage.

The total hydraulic retention time (HRT) and solids retention time (SRT) of the thermophilic digester 32 may be in the range of 1-4 days. These times are optionally split equally between the stages. For example, a 2-day thermophilic digester 32 may have two stages each with about 1 day of retention time. Alternatively, the stages may have different retention times.

In the example of FIG. 1, the thermophilic digester 32 has a tank with a cylindrical outer wall 42 and a concentric cylindrical inner wall 40. The walls 40, 42 provide an inner and outer stage. As shown, influent sludge (in this case PS 14 and thickened sludge 36) is pumped first into the outer stage. Intermediate sludge 44 flows, for example by gravity, through one or more openings (not shown) in inner wall 40. Thermophilic digestate 44 flows, by gravity or pump, to mesophilic digester 22. Optionally, sludge may flow through the thermophilic digester 32 in the reverse direction with the inner stage as the first stage and the outer stage as the second stage.

Optionally, the thermophilic digester 32 can incorporate one or more aspects of the digester and process described in International Publication Number WO 2013/056337 A1, Multiple Tank High Solids Digester, by Anaergia Inc. This publication is incorporated by reference.

Optionally, the system and process described above may be used to treat other sources of organic waste or biomass.

We claim:

1. A process for treating sewage sludge comprising the steps of:
    thickening or dewatering a waste activated sludge stream to 10% DS or more; and,
    treating the thickened or dewatered sludge stream through at least two stages of thermophilic anaerobic digestion, wherein the thickened or dewatered sludge stream has a solids content of 10% DS or more at the start of the digestion.

2. The process of claim 1 comprising thickening waste activated sludge in a screw thickener.

3. The process of claim 1 wherein a primary sludge stream, which might or might not be thickened or dewatered, is treated with the thickened or dewatered waste activated sludge stream through at least two stages of thermophilic anaerobic digestion.

4. The process of claim 3 wherein the sludges treated through the at least two stages of thermophilic anaerobic digestion have a flow averaged solids concentration of 7% DS or more.

5. The process of claim 1 wherein the at least two stages of thermophilic anaerobic digestion are performed in a digester tank having concentric cylindrical walls defining the multiple stages.

6. The process of claim 1 operated under conditions sufficient to produce Class A biosolids.

7. The process of claim 1 further comprising treating effluent from the at least two stages of thermophilic anaerobic digestion by mesophilic anaerobic digestion.

8. A sludge treatment system comprising,
    a thickening or dewatering device adapted to receive a waste activated sludge stream and produce an effluent at 10-% DS or more; and,
    a multiple stage thermophilic anaerobic digester connected to receive the effluent at 10% DS or more from the thickening or dewatering device.

9. The system of claim 8 wherein the thermophilic digester has a single continuous external wall and one or more internal walls configured to provide a multiple stage flow path through the thermophilic digester.

10. The system of claim 9 wherein the thermophilic digester has concentric cylindrical walls.

11. The system of claim 8 comprising a mesophilic anaerobic digester connected to receive effluent from the multiple stage thermophilic anaerobic digester.

* * * * *